(12) United States Patent
Okabe et al.

(10) Patent No.: US 7,416,317 B2
(45) Date of Patent: Aug. 26, 2008

(54) ILLUMINATION LAMP FOR INTERIOR VEHICLE

(75) Inventors: Toshiaki Okabe, Shizuoka (JP); Takashi Inoue, Shizuoka (JP); Yasunobu Goto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/176,220

(22) Filed: Jul. 8, 2005

(65) Prior Publication Data
US 2006/0007689 A1    Jan. 12, 2006

(30) Foreign Application Priority Data
Jul. 8, 2004 (JP) ............................ P2004-201831
Jul. 8, 2004 (JP) ............................ P2004-201832

(51) Int. Cl.
*B60Q 1/00* (2006.01)
(52) U.S. Cl. ...................... 362/488; 362/471; 362/490; 362/492
(58) Field of Classification Search ................ 362/351, 362/374, 375, 546, 488, 487, 549, 489, 490, 362/491, 492, 540, 509, 501, 471, 136, 311, 362/307
See application file for complete search history.

(56) References Cited

U.S. PATENT DOCUMENTS

| 4,443,832 A | * | 4/1984 | Kanamori et al. | ............. 362/84 |
| 5,558,364 A | * | 9/1996 | Davis | .......................... 362/488 |
| 6,160,475 A | * | 12/2000 | Hornung et al. | ............. 340/461 |
| 6,595,668 B2 | * | 7/2003 | Hatagishi et al. | ............. 362/490 |
| 6,755,550 B1 | * | 6/2004 | Lackey | ........................ 362/147 |

FOREIGN PATENT DOCUMENTS

| DE | 199 36 982 A1 | 3/2001 |
| JP | 2003-118480 A | 4/2003 |

OTHER PUBLICATIONS

German Office Action Apr. 17, 2007.

* cited by examiner

*Primary Examiner*—Bao Q Truong
(74) *Attorney, Agent, or Firm*—Sughrue Mion, PLLC

(57) ABSTRACT

An opening is formed through a roof trim of a vehicle, and a design part of an interior illumination lamp is mounted in this opening. Self-holding-purpose retaining lock piece portions are formed integrally on an opposite surface of a lens which forms part of the design part. A light shielding layer is formed on those portions of the lens corresponding respectively to the retaining lock piece portions.

4 Claims, 6 Drawing Sheets

ILLUMINATION LAMP FOR INTERIOR VEHICLE

BACKGROUND OF THE INVENTION

1. Field of the Invention

This invention relates to an interior illumination lamp mounted on an interior member such as a ceiling surface of a vehicle or a sun visor within the vehicle.

2. Related Art

An interior illumination lamp, used for illuminating the inside of a vehicle room and for other illumination purposes as when making up the user's face, is mounted on a ceiling surface of the vehicle or a sun visor within the vehicle room (see, for example, JP-A-2003-118480).

In an interior illumination lamp disclosed in JP-A-2003-118480, a room lamp is mounted on a roof panel of a vehicle body, so that a light bulb, disposed at the inner side of the roof panel, is covered with a design part (particularly, a lens).

Usually, the design part is mounted on the roof panel or a housing to cover the light bulb.

The housing is mounted on the roof panel.

Specific examples in which the lens is mounted on the roof panel or the housing will be described with reference to FIGS. 9 and 10.

In a design part 200 shown in FIG. 9, retaining lock piece portions 203 and 204 are formed integrally on an opposite surface 202 of a lens 201, and the lock piece portions 203 and 204 are retainingly engaged with a peripheral edge portion of an opening 206 formed through a roof panel 205, thereby mounting the design part 200 on the roof panel 205 in such a manner that a light bulb 207 is covered with the lens 201.

In a design part 220 shown in FIG. 10, retaining lock piece portions 223 are formed integrally respectively on four corner portions of an opposite surface 222 of a lens 221, and the retaining lock piece portions 223 are retainingly engaged with an opening portion 226 of a housing 225, thereby mounting the design part 220 on the housing 225 in such a manner that a light bulb 227 is covered with the lens 221.

The housing 225, having the lens 221 mounted thereon, is mounted in an opening 229 in a roof panel 228, so that the design part 220 is mounted on the roof panel 228.

In order to enhance a decorative design by accenting the lens 201, 221 of the design part 200, 220 aesthetically, it may be proposed to use a method of forming recesses and projections on a surface 208, 231 of the lens 201, 221 by forming cuts on this lens surface or a method of forming projections on the lens surface 208, 231 by embossing.

However, when the cuts or the embossing are merely formed on the lens surface 208, 231, the retaining lock piece portions 203 and 204, 223 and reinforcing ribs (see FIG. 10) can be viewed through the lens 201, 221 from the lens surface (208, 231) (that is, from the design surface) side, and this has invited a problem that the appearance is not attractive.

And besides, when it is desired to enhance the design of the lens 201, 221, its method must be selected from a small choice of methods (such as the method of forming cuts on the lens surface 208, 231 and the method of forming the embossing on the lens surface), and this has invited a problem that the degree of freedom of designing is low.

Furthermore, at the time when attaching and detaching the lens 201, 221, the hands of the worker are directly contacted with the lens surface 208, 231, and therefore there has been a fear that the lens surface 208, 231 is stained or damaged.

As means for solving this problem, there is known an interior illumination lamp in which a peripheral edge portion of a lens is covered with a bezel (i.e., a decorative portion).

This interior illumination lamp will be described with reference to FIG. 11. In the interior illumination lamp 300 shown in FIG. 11, a design part 301 is mounted on a roof panel 302, and a light bulb 303 is covered with the design part 301.

In the design part 301, a retaining edge portion 305 is formed at a peripheral edge of a lens body 304, and the bezel 306 is mounted on this retaining edge portion 305. The bezel 306 is retainingly engaged in an opening 308 in the roof panel 302, so that the lens body 304 and the bezel 306 are mounted in the opening 308 in the roof panel 302.

In this interior illumination lamp 300, the peripheral edge portion of the lens body 304 is covered with the bezel 306, and therefore when the design part 301 is to be mounted on the roof panel 302, the hands of the worker are prevented from directly contacting the peripheral edge portion of the lens body 304.

Therefore, the surface of the peripheral edge portion of the lens body 304 is prevented from being stained or damaged by the hands of the workers.

The bezel 306 severs as the decorative portion. Namely, recesses and projections are formed on a surface 307 of the bezel 306 by embossing, thereby making the appearance pleasing.

However, the recesses and projections are formed on the surface 307 of the bezel 306 by embossing, and therefore there has been encountered a problem that it is difficult to wipe off dirt and dust deposited on the recesses.

In addition, a color of the bezel 306 looks as a color of its surface (that is, a color of its material), and therefore a choice of the color is limited, and therefore it has been difficult to make the appearance sufficiently pleasing.

SUMMARY OF THE INVENTION

It is an object of this invention to provide an interior illumination lamp which can enhance a decorative design, and also can enhance the degree of freedom of designing, and besides can prevent a lens surface from being stained or damaged.

Another object of this invention is to provide an interior illumination lamp in which deposited dirt and dust can be easily wiped off, and besides the appearance can be made more pleasing.

The above objects have been achieved by an illumination lamp mounted in a compartment of a vehicle, comprising:

a attachment panel having an opening;

a light source accommodated in the opening;

a design part having a first surface facing to the light source and a second surface opposite to the first surface, wherein a light shielding layer is formed on at least one of the first and second surfaces.

The design part may include a lens the design part may also include a bezel attached around the lens. The lens fixed to a housing which is engaged with the opening.

Further, the illumination lamp may include a retaining lock piece portion integrally formed on the first surface, wherein the light shielding layer is formed on a portion of the design part corresponding to the retaining lock piece portion.

The light shielding layer may be formed with a covering material disposed on a peripheral portion of the design part. The covering material may be formed by least one of printing, vapor deposition, film-in-molding and coating. The shielding layer may be formed on the first surface. Alternatively, the shielding layer is formed on the second surface. Therefore, the designer can select the required light shielding layer from a large choice of layers formed by printing, vapor deposition, film-in-mold, coating and others, and therefore the degree of freedom of designing can be enhanced.

According to another aspect of the invention, there is provided an interior illumination lamp comprising a design part including a lens fixed to a housing which can be mounted in an opening formed in an interior member of a vehicle, wherein a self-holding-purpose retaining lock piece portion is formed integrally on an opposite surface of the lens; characterized in that a light shielding layer is formed on that portion of the lens corresponding to the retaining lock piece portion.

In the interior illumination lamp of the above embodiment of the present invention, the light shielding layer is formed on that portion of the lens corresponding to the retaining lock piece portion, and therefore the retaining lock piece portion is concealed by the light shielding layer from external view, that is, from view from a backside face side of the lens, so that the design can be further enhanced.

When attaching and detaching the design part or lens, this operation can be effected while holding the region of the lens where the light shielding layer is provided. Therefore, the hand of the worker is prevented from directly contacting a lens portion, and the surface of the lens portion is prevented from being stained or damaged.

In the interior illumination lamp according to one embodiment of the present invention, the light shielding layer is formed on that portion of the lens corresponding to the retaining lock piece portion, and therefore there are achieved advantages that the design can be further enhanced, that the degree of freedom of designing can be enhanced and that the surface of the lens is prevented from being stained or damaged.

According to another aspect of the invention, there is provided an interior illumination lamp comprising a design part including a lens which can be mounted in an opening formed in an interior member of a vehicle; characterized in that a light shielding layer is formed on a predetermined region of an opposite surface of the lens.

In the interior illumination lamp of the present invention, the light shielding layer is formed on the predetermined region of the opposite surface of the lens. Therefore, it is not necessary to form recesses and projections on a backside face of the lens by embossing, and therefore the backside face of the lens can be kept smooth and flat.

Therefore, even if dirt and dust should deposit on the backside face of the lens, such dirt and dust can be easily wiped off.

In addition, examples of the light shielding layer include various layers formed by printing, vapor deposition, film-in-molding, coating and others. Therefore, the designer can select the required light shielding layer from a large choice of layers formed by printing, vapor deposition, film-in-mold, coating and others, and therefore the degree of freedom of designing can be enhanced.

In the interior illumination lamp according to one embodiment of the present invention, the light shielding layer is formed on the predetermined region of the opposite surface of the lens, and therefore there is achieved an advantage that the backside face of the lens can be kept smooth and flat, and dirt and dust, deposited on this backside face, can be easily wiped off without requiring much time and labor.

In the interior illumination lamp according to one embodiment of the invention, the light shielding layer is formed on the predetermined region of the opposite surface of the lens, and therefore when the lens is viewed from a vehicle room side, a color of the light shielding layer appears at the backside face of the lens, and the backside face of the lens looks as a color different from the actual color of the lens, and therefore there is achieved an advantage that the appearance can be made more pleasing.

DETAILED DESCRIPTION OF THE PREFERRED EMBODIMENTS

Figure 1:
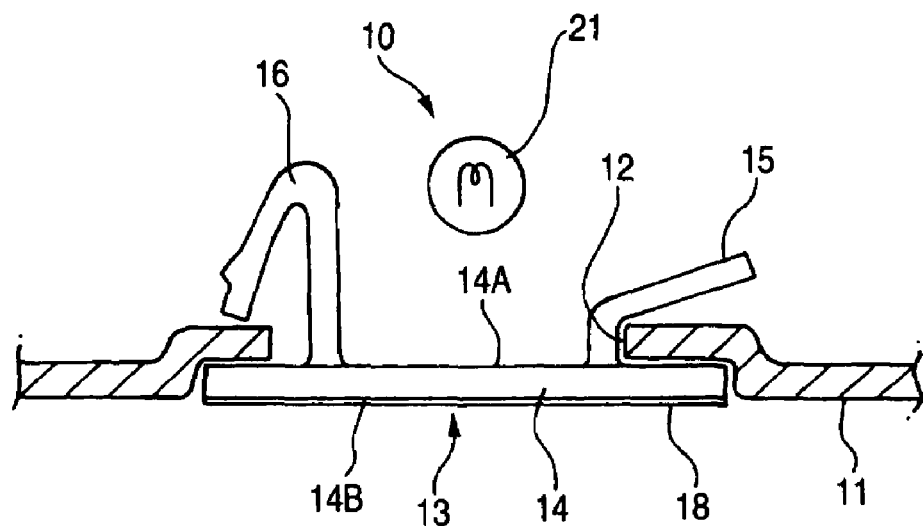
FIG. 1 is a cross-sectional view showing a first embodiment of an interior illumination lamp of the present invention.

A preferred embodiment of the present invention will now be described in detail with reference to the drawings. FIG. 1 is a cross-sectional view showing a first embodiment of an interior illumination lamp of the invention, and FIG. 2 is a perspective view showing the interior illumination lamp of the first embodiment.

Referring to the interior illumination lamp 10 of the first embodiment, an opening 12 is formed through a roof trim (interior member) 11 of a vehicle, and a design part 13 is mounted in this opening 12. Self-holding-purpose retaining lock piece portions 15 and 16 are formed integrally on an opposite surface 14A of a lens 14 (which forms part of the design part 13). A light shielding layer 18 is formed on that portion of the lens 14 corresponding to the retaining lock piece portions 15 and 16. A bulb 21 is disposed in the opening 12.

The design part 13 includes the lens 14 of a generally rectangular shape, the right retaining lock piece portion 15 which is formed on the opposite surface 14A of the lens 14, and is disposed adjacent to a right end of the lens 14, the left retaining lock piece portion 16 which is formed on the opposite surface 14A of the lens 14, and is disposed adjacent to a left end of the lens 14, and the light shielding layer 18 formed at least on those portions of the lens 14 corresponding respectively to the retaining lock piece portions 15 and 16.

Figure 2:
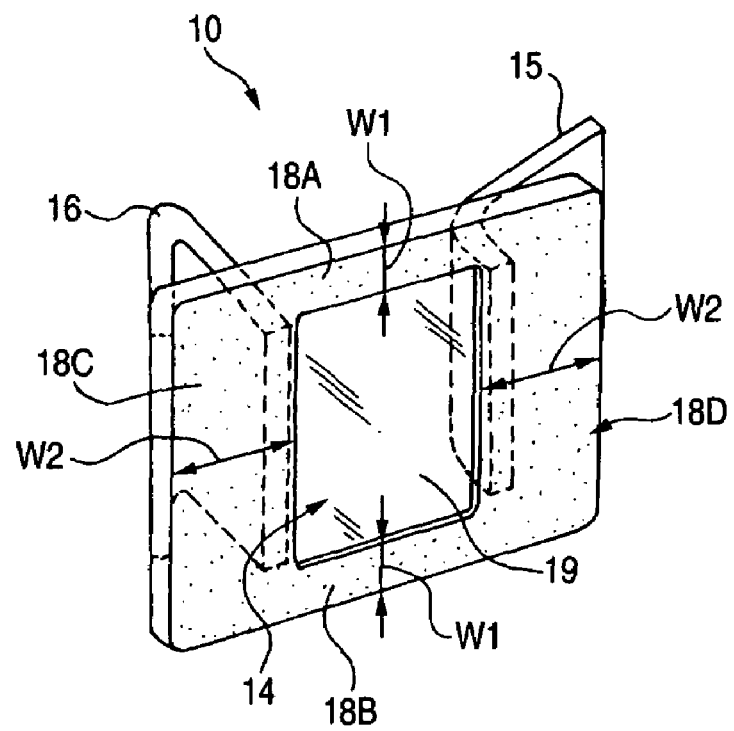
FIG. 2 is a perspective view showing the interior illumination lamp of the first embodiment.

As shown in FIG. 2, the light shielding layer 18 comprises upper and lower light shielding layers 18A and 18B of a predetermined width W1 formed on the lens 14 and extending respectively along upper and lower edges of the lens 14, and left and right light shielding layers 18C and 18D of a predetermined width W2 formed on the lens 14 and extending respectively along left and right edges of the lens 14.

Namely, the light shielding layer 18 is formed into a generally rectangular frame-like shape, and extends along the peripheral edge of the lens 14 in such a manner that its upper and lower portions and its left and right portions have the predetermined widths, respectively.

Therefore, a central portion of the lens 14 defines a lens portion 19 of a see-through nature.

The light shielding layer 18 is formed on those portions of the lens 14 corresponding respectively to the retaining lock piece portions 15 and 16.

Therefore, the retaining lock piece portions 15 and 16 are concealed by the light shielding layer 18 from external view, that is, from view from a backside face (14B) side of the lens 14, so that the design can be further enhanced.

Examples of the light shielding layer 18 include various layers formed by printing, vapor deposition, film-in-molding, coating and others.

Therefore, the designer can select the required light shielding layer 18 from a large choice of layers formed by printing, vapor deposition, film-in-molding, coating and others, and therefore the degree of freedom of designing can be enhanced.

The light shielding layer 18 is formed on the lens 14, and extends along the peripheral edge thereof, and therefore when attaching and detaching the lens 14, this operation can be effected while holding the region of the lens 14 where the light shielding layer 18 is provided.

Therefore, the hand of the worker is prevented from directly contacting the lens portion 19, and the surface of the lens portion 19 is prevented from being stained or damaged.

Figure 3:
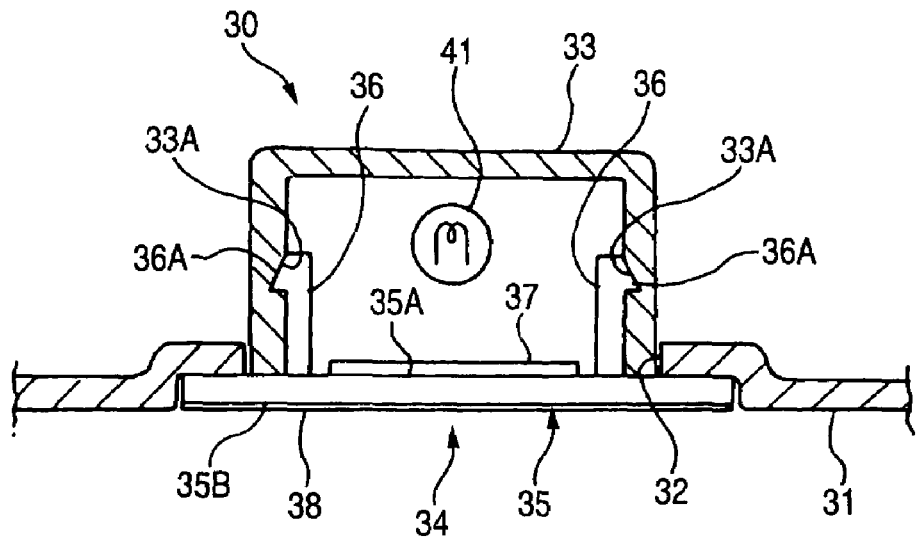
FIG. 3 is a cross-sectional view showing a second embodiment of an interior illumination lamp of the present invention.

Next, a second embodiment of the invention will be described with reference to FIGS. 3 and 4.

Referring to an interior illumination lamp 30 of the second embodiment, an opening 32 is formed through a roof trim (interior member) 31 of a vehicle, and a housing 33 is mounted in this opening 32, and a design part 34 is mounted on this housing 33. A plurality of (for example, four) retaining lock piece portions 36 are formed integrally on an opposite surface 35A of a lens 35 (which forms part of the design part 34), and also reinforcing ribs 37 are formed integrally on this opposite surface 35A. A light shielding layer 38 is formed on that portion of the lens 35 corresponding to the retaining lock piece portions 36. A bulb 41 is disposed in the housing 33.

The interior illumination lamp 30 of the second embodiment differs from the interior illumination lamp 10 of the first embodiment mainly in that the lamp 30 is provided with the housing 33.

The design part 34 includes the lens portion 35 of a generally rectangular shape, the retaining lock piece portions 36 which are provided on the opposite surface 35A of the lens 35, and are disposed adjacent respectively to four corner portions of the lens 35, and the light shielding layer 38 formed at least on those portions of the lens 35 corresponding respectively to the retaining lock piece portions 36.

The retaining lock piece portions 36 are inserted into the inside of the housing 33, and claws 36A of these retaining lock piece portions 36 are retainingly engaged respectively in engagement recesses 33A formed in an inner surface of the housing 33. Thus, the design part 34 is attached to the housing 34.

Figure 4:
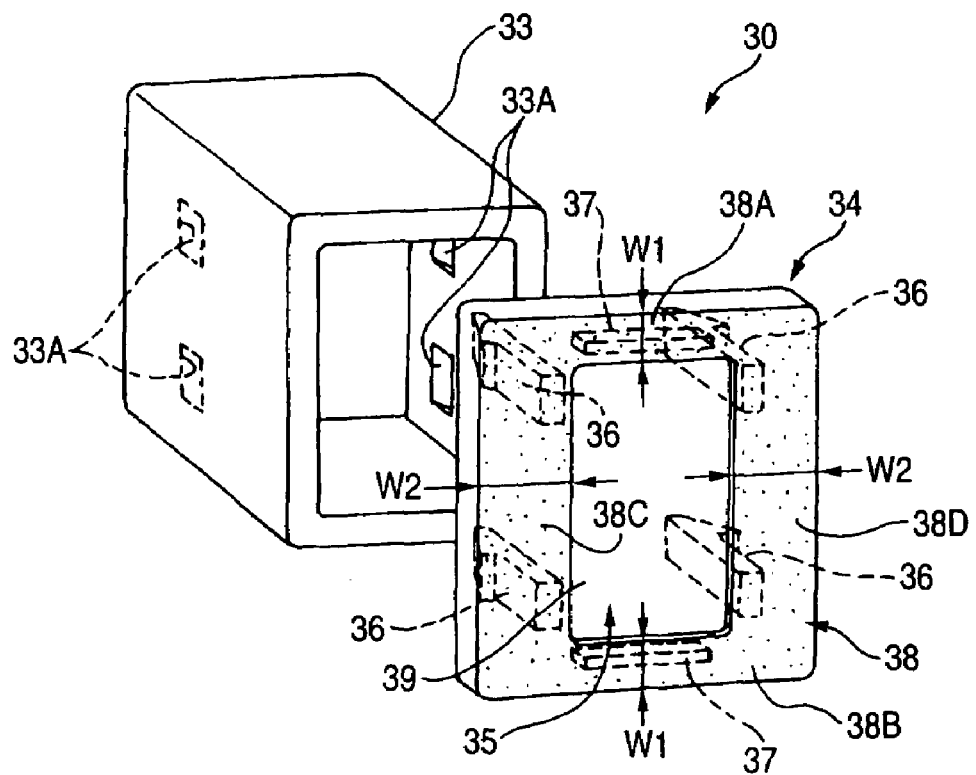
FIG. 4 is a perspective view showing the interior illumination lamp of the second embodiment.

As shown in FIG. 4, the light shielding layer 38 comprises upper and lower light shielding layers 38A and 38B of a predetermined width W1 formed on the lens 35 and extending respectively along upper and lower edges of the lens 35, and left and right light shielding layers 38C and 38D of a predetermined width W2 formed on the lens 35 and extending respectively along left and right edges of the lens 35.

Namely, the light shielding layer 38 is formed into a generally rectangular frame-like shape, and extends along the peripheral edge of the lens 35 in such a manner that its upper and lower portions and its left and right portions have the predetermined widths, respectively.

Therefore, a central portion of the lens 35 defines a lens portion 39 of a see-through nature.

The light shielding layer 38 is formed on those portions of the lens 35 corresponding respectively to the retaining lock piece portions 36 and reinforcing ribs 37.

Therefore, the retaining lock piece portions 36 and the reinforcing ribs 37 are concealed by the light shielding layer 38 from external view, that is, from view from a backside face (35B) side of the lens 35, so that the design can be further enhanced.

As described above for the light shielding layer 18 of the first embodiment, examples of the light shielding layer 38 include various layers formed by printing, vapor deposition, film-in-molding, coating and others.

Therefore, the designer can select the required light shielding layer 38 from a large choice of layers formed by printing, vapor deposition, film-in-molding, coating and others, and therefore the degree of freedom of designing can be enhanced.

The light shielding layer 38 is formed on the lens 35, and extends along the peripheral edge thereof, and therefore when attaching and detaching the lens 35, this operation can be effected while holding the region of the lens 35 where the light shielding layer 38 is provided.

Therefore, the hand of the worker is prevented from directly contacting the lens portion 39, and the surface of the lens portion 19 is prevented from being stained or damaged.

In the above first and second embodiments, although the interior illumination lamp 10, 30 is mounted on the roof trim 11 (serving as the interior member of the vehicle), the mounting region is not limited to the roof trim. For example, the interior illumination lamp 10, 30 can be mounted on any other suitable region such as a sun visor.

In the above first and second embodiments, although the light shielding layer 18, 38 is formed into the generally rectangular frame-like shape, and extends-along the peripheral edge of the lens 14, 35 in such a manner that its upper and lower portions and its left and right portions have the predetermined widths, respectively, the light shielding layer 18, 38 is not limited to this shape.

In short, the light shielding layer 18, 38 need to be formed into such a shape that the retaining lock piece portions 15 and 16, 36 and the reinforcing ribs (37), formed on the opposite surface 14A, 35A of the lens 14, 35, will be concealed from external view.

The material, shape, dimensions, form, number, disposition, etc., of each of the interior illumination lamp 10, 30, the roof trim 11, 31, the opening 12, 32, the design part 13, 34, the lens 14, 35, the retaining lock piece portions 15 and 16, 36, the light shielding layer 18, 38 and so on in each of the above embodiments are arbitrary, and are not limited in so far as the invention can be achieved.

Figure 5:
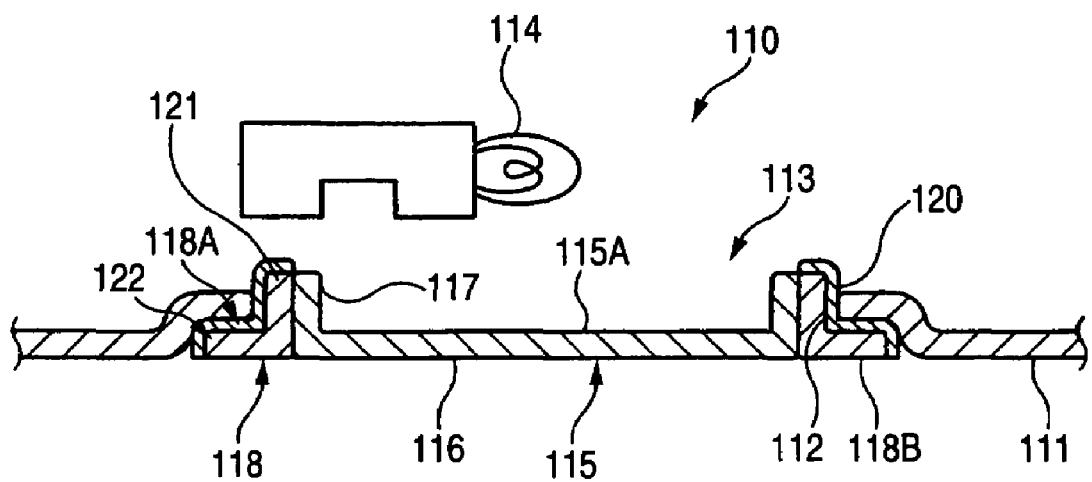
FIG. 5 is a cross-sectional view showing a third embodiment of an interior illumination lamp of the present invention.
Figure 6:
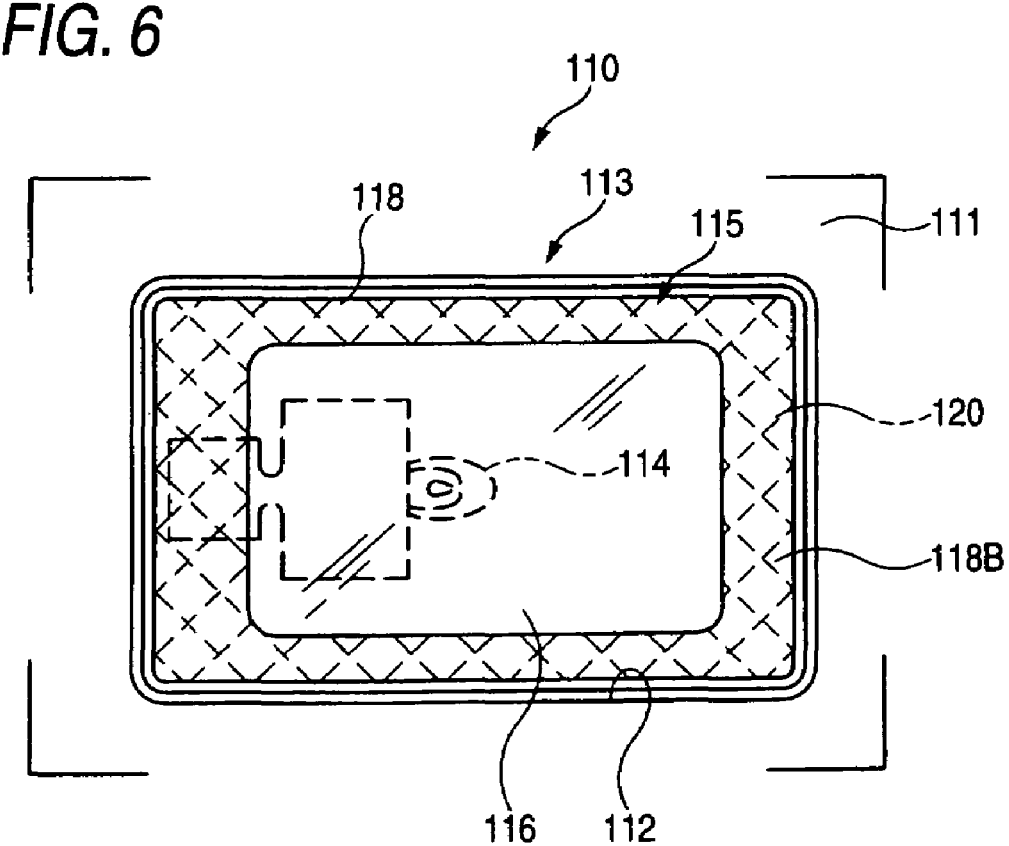
FIG. 6 is a plan view showing the interior illumination lamp of the third embodiment.

FIG. 5 is a cross-sectional view showing a third embodiment of an interior illumination lamp of the invention, and FIG. 6 is a plan view showing the interior illumination lamp of the third embodiment.

Referring to the interior illumination lamp 110 of the third embodiment, an opening 112 is formed through a roof trim (interior member) 111 of a vehicle, and a design part 113 is mounted in this opening 112. A light bulb 114 is disposed above the design part 113.

The design part 113 includes a lens 115 which can be mounted in the opening 112, and a light shielding layer 120 is formed on a predetermined region 118A of an opposite surface 115A of the lens 115.

The lens 115 comprises a lens body 116 of a generally rectangular shape having a retaining edge portion 117 formed at a peripheral edge of the lens body 116, and a transparent bezel 118 mounted on the retaining edge portion 117.

The light shielding layer 120 is formed on the opposite surface 118A (that is, the predetermined region of the opposite surface 115A of the lens 115) of the transparent bezel 118.

The transparent bezel 118 includes a fitting portion 121 fitted on the retaining edge portion 117 of the lens body 116, and an extension portion 122 extending outwardly from the fitting portion 121. As shown in FIG. 6, the transparent bezel 118 is formed into a generally rectangular frame-shape. This transparent bezel 118 is made of a transparent material.

An opposite surface of the fitting portion 121 and an opposite surface of the extension portion 122 jointly define the opposite surface 118A of the transparent bezel 118.

The light shielding layer 120 is formed on the opposite surface 118A of the transparent bezel 118, and therefore the light shielding layer 120 is formed into a generally rectangular frame-shape as shown in FIG. 6.

The transparent-bezel 118 is made of the transparent material. Therefore, by forming the light shielding layer 120 on the opposite surface 118A of the transparent bezel 18, a color of the light shielding layer 120 appears at a backside face 118B of the transparent bezel 118.

Therefore, when the lens 115 is viewed from a vehicle room side, the backside face 118B of the transparent bezel 118 looks as a color different from the actual color of the surface 118B.

As described above, in the interior illumination lamp 110 of the invention, the light shielding layer 120 is formed on the opposite surface 118A of the transparent bezel 118.

Therefore, it is not necessary to form recesses and projections on the backside face 118B of the transparent bezel 118 by embossing, and therefore the backside face 118B of the transparent bezel 118 can be kept smooth and flat.

Therefore, even if dirt and dust should deposit on the backside face 118B of the transparent bezel 118, such dirt and dirt can be easily wiped off.

In addition, examples of the light shielding layer 120 include various layers formed by printing, vapor deposition, film-in-molding, coating and others. Therefore, the designer can select the required light shielding layer 120 from a large choice of layers formed by printing, vapor deposition, film-in-molding, coating and others, and therefore the degree of freedom of designing can be enhanced.

Figure 7:
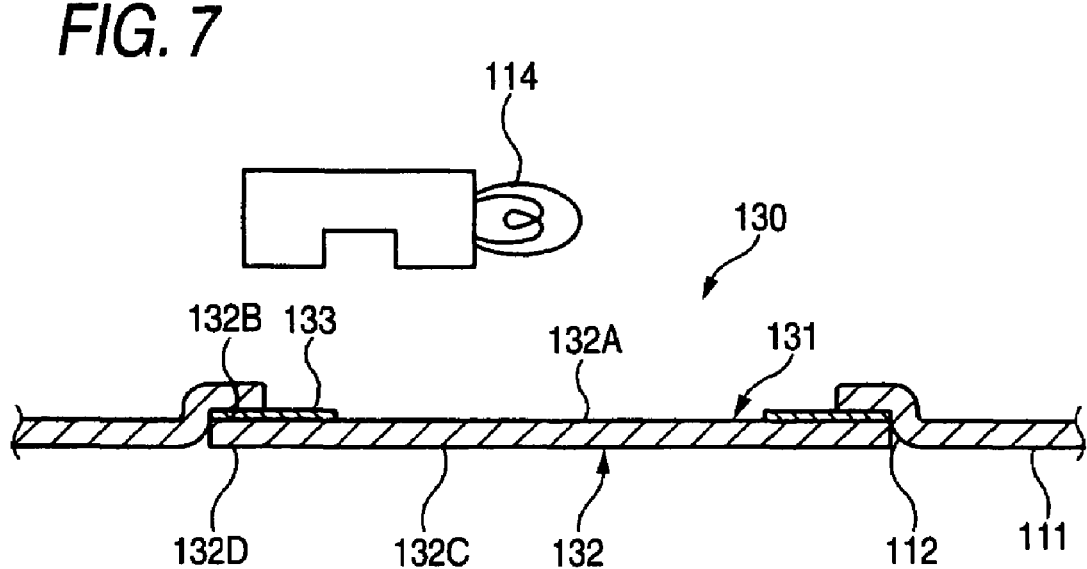
FIG. 7 is a cross-sectional view showing a fourth embodiment of an interior illumination lamp of the present invention.

Next, a fourth embodiment of the invention will be described with reference to FIGS. 7 and 8. In an interior illumination lamp 130 of the fourth embodiment, those members identical to those of the interior illumination lamp 110 of the third embodiment will be designated by identical reference numerals, respectively, and explanation thereof will be omitted.

Referring to the interior illumination lamp 130 of the fourth embodiment, an opening 112 is formed through a roof trim (interior member) 111 of a vehicle, and a design part 131 is mounted in this opening 112. Alight bulb 114 is disposed above the design part 131.

The design part 131 includes a lens 132 which can be mounted in the opening 112, and a light shielding layer 133 is formed on a predetermined region 132B of an opposite surface 132A of the lens 132.

The lens 132 is made of a transparent material, and is formed into a generally rectangular shape. The light shielding layer 133 is formed on that portion (that is, the predetermined region) 132B of the opposite surface 132A of the lens 132 extending along the peripheral edge thereof.

Figure 8:
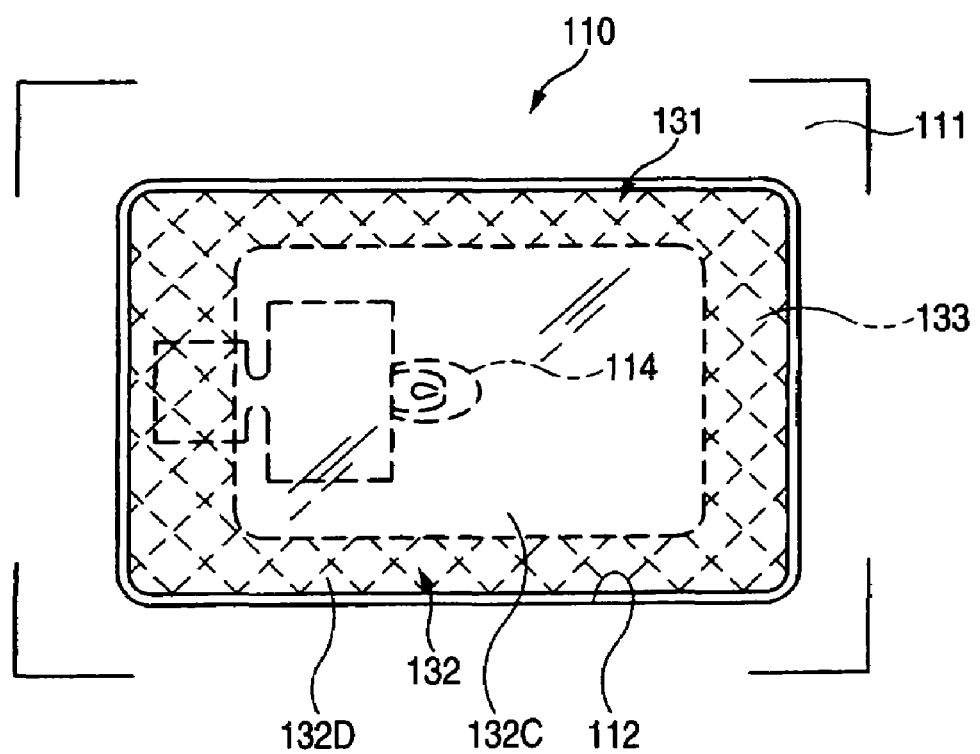
FIG. 8 is a plan view showing the interior illumination lamp of the fourth embodiment.
Figure 9:
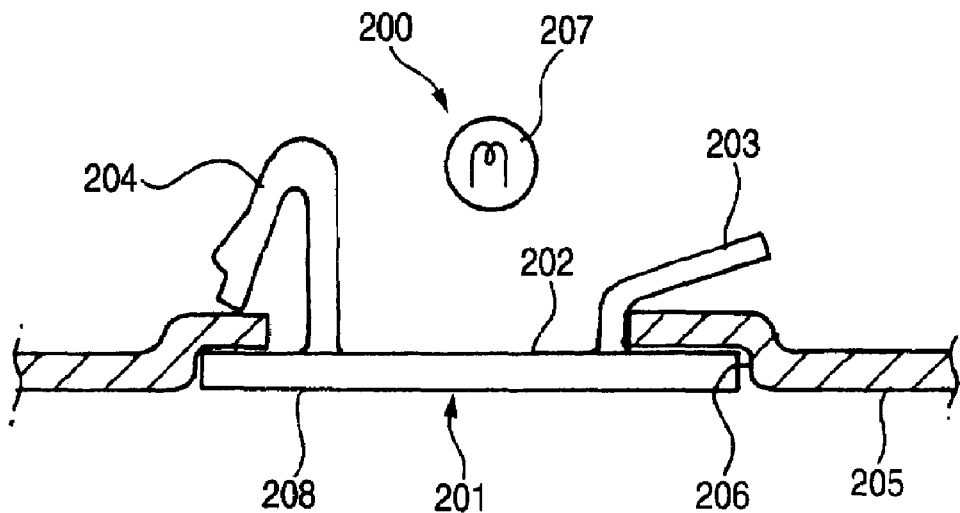
FIG. 9 is a cross-sectional view showing a conventional interior illumination lamp.
Figure 10:
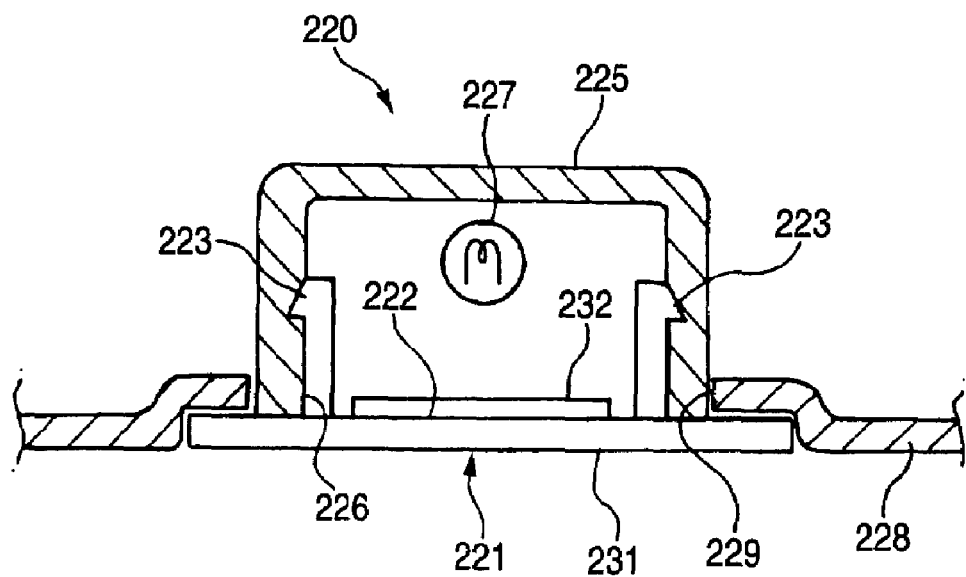
FIG. 10 is a cross-sectional view showing another conventional interior illumination lamp.
Figure 11:
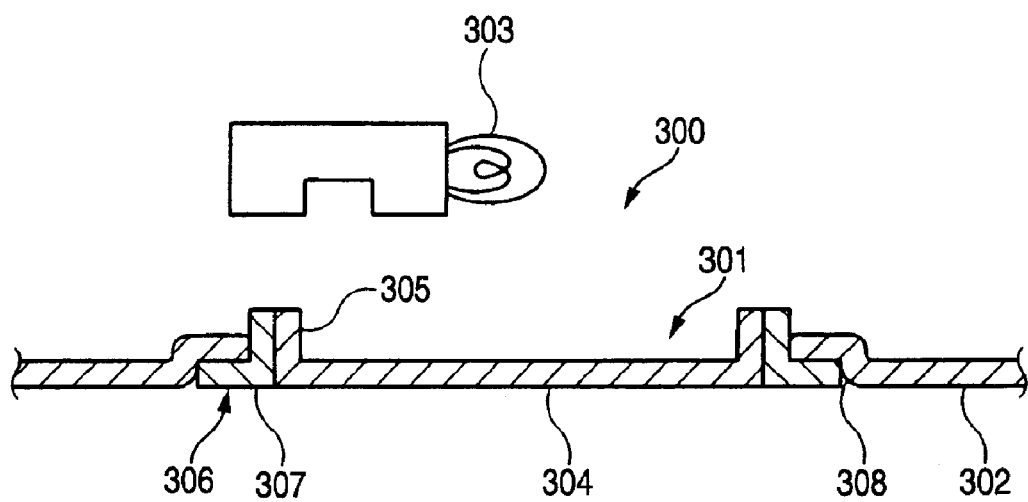
FIG. 11 is a cross-sectional view showing a conventional interior illumination lamp.

Thus, the lens 132 is made of the transparent material, and the light shielding layer 133 is formed on that portion of the opposite surface 132A of the lens 132 extending along the peripheral edge thereof (that is, on the predetermined region 132B of the opposite surface 132A extending along the peripheral edge thereof), so that the light shielding layer 133 is formed into a generally rectangular frame-shape as shown in FIG. 8.

The lens 132 is made of the transparent material as described above. Therefore, by forming the light shielding layer 133 on the predetermined region 132B of the opposite surface 132A of the lens 132, a color of the light shielding layer 133 appears at a region 132D of a backside face 132C of the lens 132 corresponding to the predetermined region 132B.

Therefore, when the lens 132 is viewed from a vehicle room side, the region 132D of the backside face 132C of the lens 132, corresponding to the predetermined region 132B, looks as a color different from the actual color of the region 132D.

As described above, in the interior illumination lamp 130 of the invention, the light shielding layer 133 is formed on the predetermined region 132B of the opposite surface 132A of the lens 132.

Therefore, it is not necessary to form recesses and projections on the region 132D of the backside face 132C of the lens 132 (corresponding to the predetermined region 132B) by embossing, and therefore the region 132D, corresponding to the predetermined region 132B, can be kept smooth and flat.

Therefore, even if dirt and dust should deposit on the region 132D corresponding to the predetermined region 132B, such dirt and dirt can be easily wiped off.

In addition, examples of the light shielding layer 133 include various layers formed by printing, vapor deposition, film-in-molding, coating and others. Therefore, the designer can select the required light shielding layer 133 from a large choice of layers formed by printing, vapor deposition, film-in-molding, coating and others, and therefore the degree of freedom of designing can be enhanced.

In the above third and fourth embodiments, although the interior illumination lamp 110, 130 is mounted on the roof trim 111 (serving as the interior member of the vehicle), the mounting region is not limited to the roof trim. For example, the interior illumination lamp 110, 130 can be mounted on any other suitable region such as a sun visor.

In the above third and fourth embodiments, although the light shielding layer 120, 133 is formed into the generally rectangular frame-like shape, and extends along the peripheral edge of the lens 115, 132 in such a manner that its upper and lower portions and its left and right portions have the predetermined widths, respectively, the light shielding layer 120, 133 is not limited to this shape.

In short, the light shielding layer 120, 133 need to be formed into such a shape as to enhance the design of the lens 115, 132.

The material, shape, dimensions, form, number, disposition, etc., of each of the interior illumination lamp 110, 130, the roof trim 111, the opening 112, the design part 113, 131, the lens 115, 132, the transparent bezel 118, the light shielding layer 120, 133 and so on in each of the above embodiments are arbitrary, and are not limited in so far as the invention can be achieved.

What is claimed is:

1. An illumination lamp mounted in a compartment of a vehicle, comprising:

an attachment panel having an opening;

a light source accommodated in said opening;

a design part having a first surface facing to said light source and a second surface opposite to said first surface, wherein a light shielding layer is formed on at least one of said first and second surfaces; and wherein said design part includes a lens, wherein said design part includes a bezel attached around said lens, and wherein the light shielding layer is disposed between the bezel and the attachment panel.

2. The illumination lamp according to claim 1, wherein said light shielding layer is formed with a covering material disposed on a peripheral portion of said design part.

3. The illumination lamp according to claim 2, wherein said covering material is formed by any of printing, vapor deposition, film-in-molding and coating.

4. The illumination lamp according to claim 1, wherein said shielding layer is formed on said first surface.

* * * * *